Jan. 11, 1927.
W. PIERPOINT
INSECT TRAP
Filed Sept. 30, 1925
1,614,153
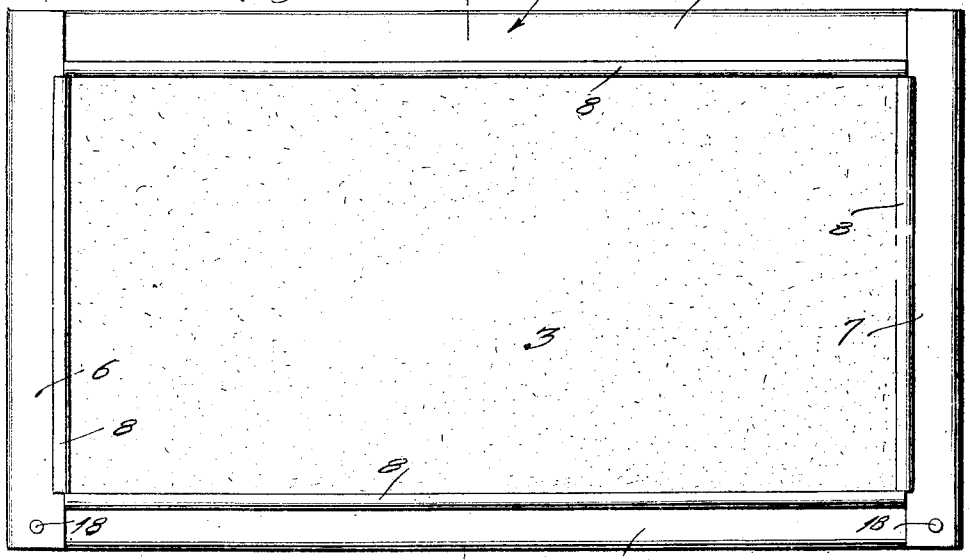
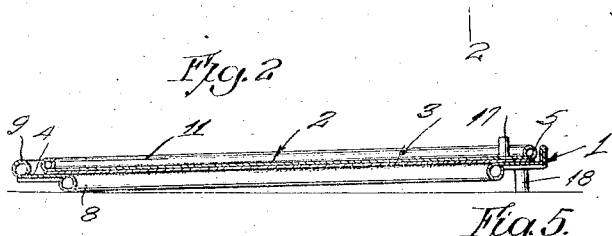
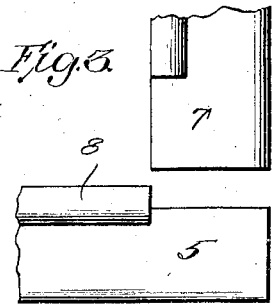
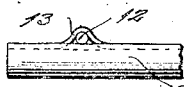
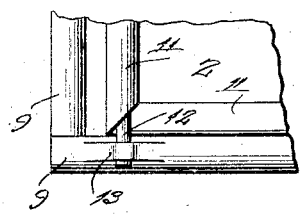
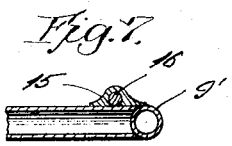
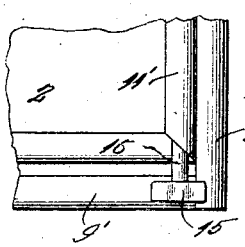
Inventor
Walter Pierpoint
By J. S. Carpenter
Atty.

Patented Jan. 11, 1927.

1,614,153

UNITED STATES PATENT OFFICE.

WALTER PIERPOINT, OF ALEXANDRIA, VIRGINIA.

INSECT TRAP.

Application filed September 30, 1925. Serial No. 59,506.

My invention relates to improvements in insect traps, and is more particularly directed to that type of trap embodying a strip of adhesive paper for catching insects.

The object of my intention is to provide a trap of the class described so constructed as to permit its use for catching both flying and crawling insects.

A further object of my invention is to provide a trap of the class described which is adapted to function in its normal position for catching flies, and the like, and in its inverted position for catching crawling insects, such as cockroaches.

Still another object of my invention is to provide a holder for adhesive paper so constructed as to retain the same and prevent it from being accidentally moved when placed upon a table or the like for catching flies, as well as to support the paper from the floor or the like when the frame is inverted, thus permitting insects to crawl under the frame and come in contact with the adhesive side of the paper.

With the above and other objects in view which will appear as the description proceeds, my invention resides in the novel construction, combination and arrangement of parts substantially as hereinafter described and more particularly defined by the appended claims, it being understood that such changes in the precise embodiment of the hereinafter disclosed invention may be made as come within the scope of the claims.

In the accompanying drawing, I have illustrated one complete example of the physical embodiment of my invention constructed according to the best mode I have so far devised for the practical application of the principles thereof, and in which:—

Figure 1 is a top plan view of my improved trap, showing the same in its normal position with a piece of adhesive coated paper therein.

Figure 2 is a sectional view taken on the line 2—2 Figure 1 and showing the holder in its inverted position.

Figure 3 is an enlarged detail view illustrating the manner in which the adjacent side members of the frame are connected.

Figure 4 is a side elevation of one section of the frame showing the manner of forming the hinge connection for the movable back of the frame.

Figure 5 is a detail view showing the movable back connected to one side of the frame, and Figures 6 and 7 illustrate a modification of the hinge connection for the back.

Briefly stated, my invention consists of a rectangular frame 1, formed of sheet metal or the like, provided with a movable back 2 which is hinged to the side walls of the frame and adapted to retain within the frame a sheet of the usual adhesive coated fly paper 3.

The frame as described above is adapted to hold the paper in two positions, one position being that disclosed in Figure 1 for catching flies and the other being that disclosed in Figure 2. In this latter position the adhesive side of the paper is held in spaced relation with the frame support to permit insects to crawl under the frame, and when they do so, their backs come in contact with the adhesive coated paper.

Referring more particularly to the drawing, the frame 1 is composed of side bars 4 and 5, and end bars 6 and 7, the adjacent end portions of which are connected in any desired manner, but preferably in a manner similar to that disclosed in Figure 3, wherein one bar over laps the other and is secured thereto by welding or the like.

As disclosed in Figures 2 and 3 it will be noted that the inner edges of the bars are rolled outwardly, as indicated at 8, to provide a stop for the fingers when handling the frame so as to prevent them from coming in contact with the adhesive paper. These rolled portions or edges 8 terminate short of the end portions of the bars so as to permit a connection of the bars by overlapping as disclosed in Figure 3. The outer edges of the bars are rolled in a direction opposite to that of the first roll, as indicated at 9, thus forming a substantial flange around the frame for retaining the paper 3 in place.

In order to maintain the paper 3 within the frame I have connected to the latter a movable back 2 which bears upon the back of the paper and clamps it against the frame 1. By this arrangement, the paper is maintained within the frame regardless of the position of the latter. Furthermore, it will be apparent that the paper is maintained in a functioning position regardless of the position occupied by the frame until the active surface of the paper has become filled with the insects, after which the paper is removed from the frame 1 by swinging the movable back 2 upon its pivot, thus freeing the paper and permitting its ready removal from the main frame.

As disclosed in Figures 2 and 5, I have shown the back 2 as being provided with rolled edges 11, one of which surrounds a wire 12 the end portions of which project outwardly and are received under stamped up portions 13 formed from the rolled edges 9 of the end bars 6 and 7, this arrangement forming a hinge connection for the back 2.

In Figures 6 and 7, I have illustrated a modification of the hinge connection, and upon referring to these it will be noted that the rolled edges 9' of the end bars 6 and 7 have fixed thereto a projection 15 from which projects a rigid rod 16, the end portion of which is received within the roll 11' of the movable back 2.

As further disclosed in Figures 1 and 2, the back 2 is provided with a handle or lug 17, while the front face of the frame 1 has secured thereto legs 18 which, in connection with one side of the frame, tend to support the frame in a position similar to that disclosed in Figure 2, which by reason of its inclination makes the trap applicable for catching crawling insects of various sizes.

Having thus fully described my invention, what I claim as new, and desire to secure by Letters Patent, is:—

1. A trap of the class described including a rectangular frame having marginal edge portions, a strip of adhesive paper within said frame, a back hingedly connected to certain of said edge portions and adapted to retain the paper within said frame, projections formed upon the face of the frame, and said projections and certain other of said edge portions adapted to support the frame upon an incline when the same is in its inverted position.

2. A trap of the class described including a rectangular frame having edge portions extending at right angles to the main body of the frame, a strip of adhesive paper within said frame, a back hingedly connected to certain of said edge portions and adapted to retain the paper within said frame, projections formed upon the face of the frame, and said projections and certain other of said edge portions adapted to support the frame upon an incline when the same is in its inverted position.

3. A trap of the class described including a rectangular frame the inner and outer edges of which are rolled in opposite directions, a strip of adhesive paper within said frame, a back hingedly connected to certain of the rolled edges and adapted to retain the paper within said frame, projections formed upon the face of the frame, and said projections and certain other of the rolled edges adapted to support the frame upon an incline when the same is in an inverted position.

In testimony whereof I affix my signature.

WALTER PIERPOINT.